United States Patent [19]
Burns

[11] Patent Number: 4,741,611
[45] Date of Patent: May 3, 1988

[54] EYEGLASSES ADAPTED FOR SPORTS AND PROTECTIVE USE

[75] Inventor: Dennis L. Burns, Seattle, Wash.

[73] Assignee: Pro-Tec, Inc., Kent, Wash.

[21] Appl. No.: 714,906

[22] Filed: Jan. 27, 1986

Related U.S. Application Data

[63] Continuation of Ser. No. 247,987, Mar. 26, 1981, abandoned.

[51] Int. Cl.$^4$ .............................................. G02C 7/10
[52] U.S. Cl. ...................................... 351/44; 351/41; 351/136
[58] Field of Search ................. 2/442, 443, 432, 439; 351/41, 44, 136, 137, 138; 350/434

[56] References Cited

U.S. PATENT DOCUMENTS

Des. 178,178 7/1956 Fleming.
Des. 178,179 7/1956 Fleming.
Des. 199,150 9/1964 Carmichael.
3,605,116 2/1968 Simpson et al..
3,713,732 1/1973 Gooch.

Primary Examiner—Rodney B. Bovernick
Attorney, Agent, or Firm—Seed and Berry

[57] ABSTRACT

Protective and sports eyeglasses having a pair of integrally formed, wraparound lenses. The lenses have toric inner and outer surfaces which match each other on both meridians so that the lenses have zero power. A shock-absorbing nosepiece includes a base portion which wraps around a bridge integrally formed with the lenses and a pair of resilient, relatively large nose pads projecting downwardly and rearwardly along respective inside edges of the lenses. The nose pads are spaced slightly from the lenses so that they are capable of absorbing shocks imparted to the lenses. A pair of temples are pivotally secured to respective lenses by hinges which are embedded in respective mounting pads integrally formed in the lenses. The lenses may be formed from a tough, shock-resistant plastic, such as polycarbonate, and they may be provided with a hard, non-scratch coating.

9 Claims, 2 Drawing Sheets

EYEGLASSES ADAPTED FOR SPORTS AND PROTECTIVE USE

This application is a continuation of U.S. patent application Ser. No. 247,987, filed Mar. 26, 1981 now abandoned.

TECHNICAL FIELD

This invention relates to eyewear and, more particularly, to protective eyeglasses which are specially adapted for sports use.

BACKGROUND ART

Non-corrective eyeglasses, such as sunglasses or protective eyeglasses, normally utilize spherical lenses which have substantially the same radius of curvature in both the horizontal and vertical meridians. Such eyeglasses usually do not have sufficient wrap depth to adequately shield the eye from light, wind, and objects at the sides. A large wrap depth is achieved by using lenses which have a sufficiently small radius of curvature to allow the lenses to curve around the sides of the wearer's face. However, spherical lenses having sufficient curvature in the horizontal meridian to provide an adequate wrap depth have an excessive radius of curvature in the vertical meridian, which causes the lenses to project forwardly an excessive distance, thus giving a "bug-eyed" appearance. U.S. Pat. No. 3,526,449, issued to Bolle et al, discloses eyeglasses which use a spherical lens having substantial wrap depth and also use relatively wide temples to shield the wearer's face.

Attempts have been made to provide a lens having sufficient wrap depth without causing the lens to project forwardly an excessive distance, principally by varying the radius of curvature of the lens in the horizontal meridian. Accordingly, the lenses have relatively little curvature at the front, but the curvature increases substantially toward the outer edges of the lenses. An example of this technique is illustrated in U.S. Pat. No. 2,537,047, issued to Gatten. The principal disadvantage of such lenses is the optical distortion caused where the radius of curvature in a horizontal meridian quickly changes. As a result, the optical quality of prior art eyeglasses incorporating this technique has not been particularly great.

Another problem associated with protective eyeglasses adapted for sports use is the inability of the eyeglasses to absorb shocks imparted to the lenses. Conventional eyeglasses generally utilize a nosepiece which is either integrally formed with the lenses or frame or rigidly secured to the frame. As a result, shocks imparted to the lenses by objects are coupled directly to the nose of the wearer, sometimes causing injury.

DISCLOSURE OF THE INVENTION

It is an object of the invention to provide eyeglasses having sufficient wrap depth to adequately shield the eye while conforming quite closely to the wearer's face.

It is another object of the invention to provide eyeglasses of the character described having excellent optical properties.

It is still another object of the invention to provide eyeglasses having a shock-absorbing nosepiece to isolate the wearer's nose from shocks imparted to the lenses.

It is a further object of the invention to secure a nosepiece to the bridge of eyeglasses in a manner which strengthens the bridge and isolates the nosepiece from shocks imparted to the lenses.

These and other objects of the invention are provided by eyeglasses having a pair of lenses and a bridge integrally formed with each other. The lenses have a substantial wrap depth and toric inner and outer surfaces which match each other to provide zero power. A shock-absorbing nosepiece is secured to the bridge, and a pair of temples are pivotally secured to the outer edges of respective lenses. The nosepiece includes a base portion which tightly surrounds the bridge but is not rigidly secured thereto so that the nosepiece is capable of floating to some extent and thus absorbing shocks imparted to the lens. The nosepiece also includes a pair of nose pads which project from the base portion along respective inner edges of the lenses. The nose pads are resilient and spaced apart from the lenses so that they are capable of absorbing shock imparted to the lenses. The nose pads are also relatively large so that the area of contact between the nose pads and the nose of a wearer is substantially larger than in conventional eyeglasses in order to spread shock-induced forces over a relatively large area. The upper edges of the lenses include an integrally formed rim to strengthen the lenses. Also integrally formed with the lenses are respective mounting pads formed at the outer edges of the lenses in which hinges connecting the temples to the lenses are embedded.

BEST MODE FOR CARRYING OUT THE INVENTION

Figure 1:
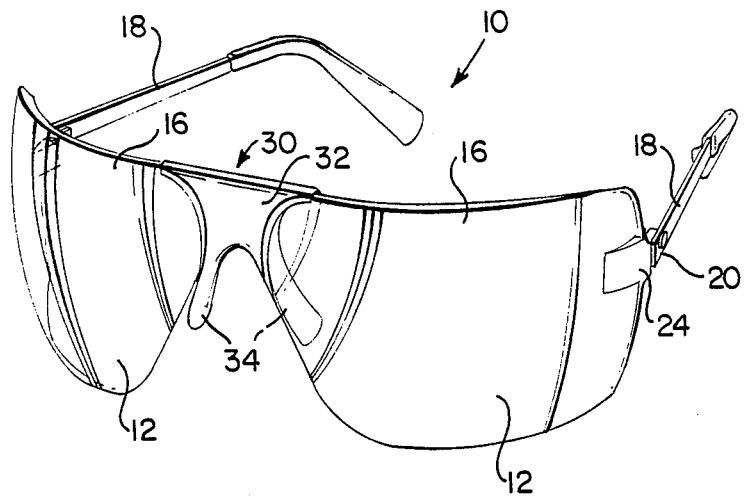
FIG. 1 is an isometric view of the eyeglasses.
Figure 2:
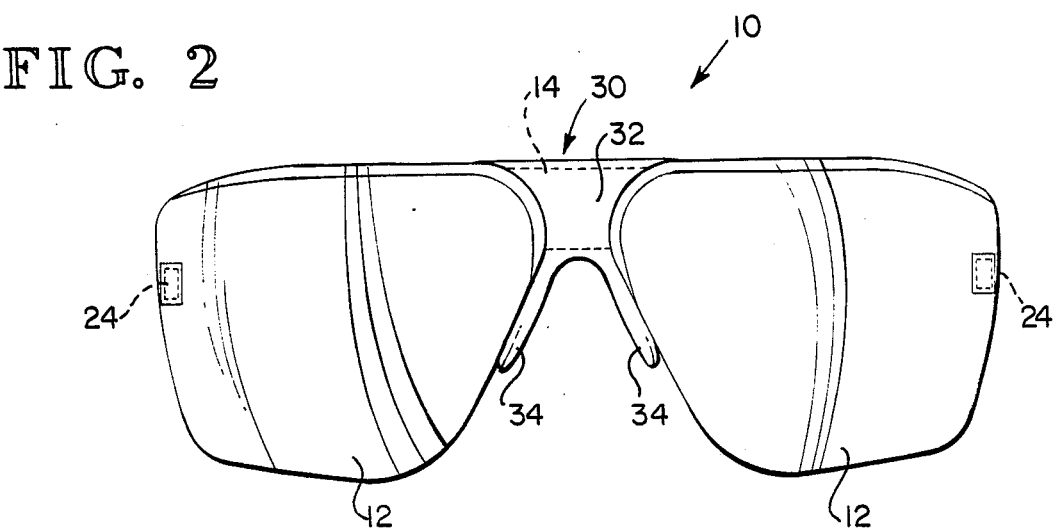
FIG. 2 is a front elevational view of the eyeglasses.
Figure 3:
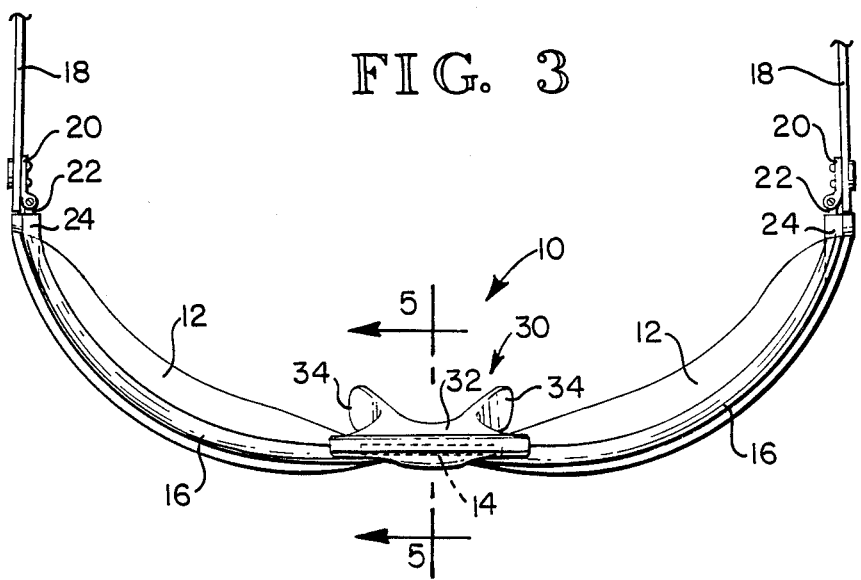
FIG. 3 is a top plan view of the eyeglasses.
Figure 4:
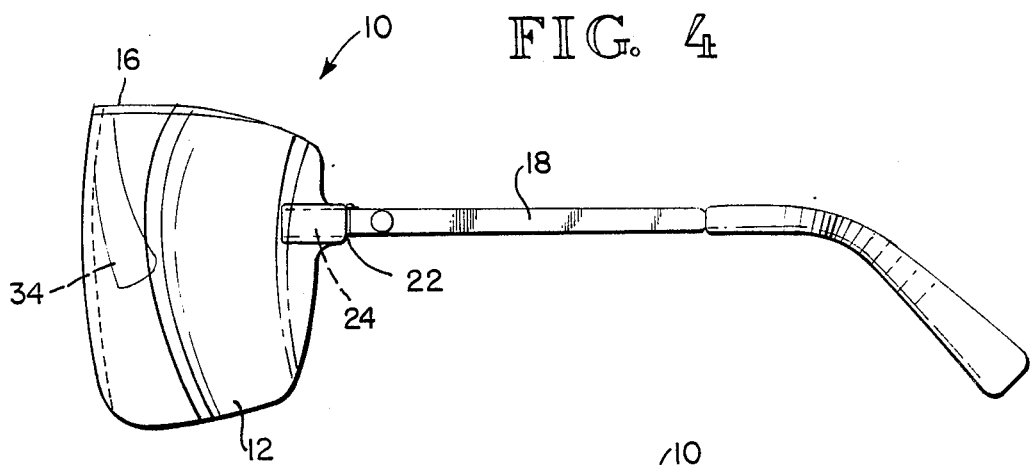
FIG. 4 is a side elevational view of the eyeglasses with the temples extended.

The protective eyeglasses 10, as illustrated in the figures, include a pair of wraparound lenses 12 interconnected by an integrally formed bridge 14. The lower edge of the bridge 14 is spaced well above the nose of a wearer when in use to provide clearance for a nosepiece (described hereinafter) between the bridge 14 and nose.

The lenses 12 have toric inner and outer surfaces of uniform radius of curvature throughout. That is, the radius of curvature in the horizontal meridian or plane is substantially greater than the radius of curvature in the vertical meridian or plane. The relatively large curvature of the lenses 12 in the horizontal meridian allows the lenses 12 to have a fairly large wrap depth. However, the relatively slight curvature of the lenses 12 in the vertical meridian causes the lenses 12 to conform quite closely to the face of the wearer, thus avoiding the aforementioned "bug-eyed" problem of spherical lenses having substantial wrap depth. The lenses 12, by utilizing a constant radius of curvature in each meridian, have substantially better optical properties than conventional eyeglasses which utilize lenses having relatively little curvature in the front and substantially greater curvature at the sides.

The toric curvature of the inner surfaces of the lenses 12 match the toric curvature of the outer surfaces of the lenses 12 so that the lenses 12 are of uniform thickness throughout and thus have zero power. In one embodiment, for example, the outer surfaces have a vertical meridian of +4.75 diopters and a horizontal meridian of about +10 diopters. The inner surface of the lenses 14 has a vertical meridian of −4.7 diopters and a horizontal meridian of about −10 diopters.

The lenses 12 are preferably formed of a tough, moldable plastic, such as polycarbonate, and they are preferably coated to resist scratching. Although clear lenses 12 will generally be preferred for indoor sports and for protective use (for example, around machinery), the lenses 12 may be tinted a variety of colors for outdoor use.

A relatively thick rim 16 is integrally formed along the upper edges of the lenses 12 to strengthen the lenses 12. The slight resiliency of the lenses 12, coupled with the presence of the reinforcing rims 16, allow the eyeglasses 10 to withstand a great deal of shock.

The lenses 12 have inner surfaces which diverge away from each other and away from the bridge 14 to provide sufficient clearance for the nose of the wearer.

A pair of temples 18 of conventional design are secured to the lenses 12 with conventional hinges 20. One leg 22 of each hinge 20 is embedded in respective mounting pads 24 integrally formed along the outer edge of each lens 12.

The bridge 14 is surrounded by a uniquely designed nosepiece 30 having a resilient base portion 32 from which a pair of nose pads 34 project downwardly and rearwardly along the inner surfaces of the lenses 12. The nose pads 34 are spaced apart slightly from the inner edges of the lenses 12, and, like the base portion 32, they are somewhat resilient so that they are capable of absorbing shocks imparted to the lenses 12 by objects striking the lenses 12. Also, the nose pads 34 are relatively long (preferably at least 2 cm) and relatively wide (preferably a mean width of at least 0.7 cm) so that the area of contact between the nose pads 34 and the nose of a wearer is relatively large, thus spreading out forces imparted to the lenses 12 over a relatively wide area of the nose. Despite the relatively large size of the nose pads 34, the eyeglasses retain an attractive appearance because the rearward projection of the nose pads 34 partially hides the nose pads 34 behind the lenses 12.

Figure 5:
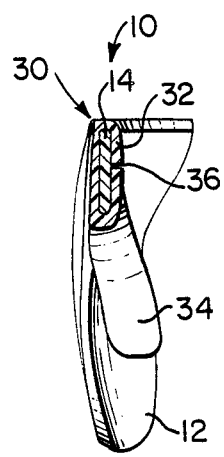
FIG. 5 is a cross-sectional view taken along the line 5—5 of FIG. 3 showing the manner in which the nosepiece is secured to the bridge.

As best illustrated in FIG. 5, the base portion 32 of the nosepiece 30 tightly surrounds the bridge 14, but it is not rigidly secured thereto. Consequently, the resiliency of the base portion 32 allows it to deform and "float" to some extent, thus assisting the nose pads 34 in absorbing shocks imparted to the lenses 12. The base portion 32 is preferably secured around the bridge 14 by opening the base portion along a slot 36 (FIG. 5) to allow the base portion 32 to surround the bridge 14. The edges of the slot 36 may then be bonded to each other, preferably ultrasonically, so that the slot 36 virtually disappears. Consequently, there are no glues or adhesives to break down with time. The base portion 32 also serves to strengthen the bridge 14 to more securely fasten the lenses 12 to each other. Although the inventive nosepiece 30 has been described in combination with eyeglasses having zero power toric lenses, it will be understood that it may also be used with sports or protective eyeglasses using other lens types or, less advantageously, with eyeglasses designed for normal wear.

The protective eyeglasses are thus specially adapted for sports use since they have an extremely advantageous wrap depth for protecting the eye from objects, light, and wind at the sides. Furthermore, the use of double toric lenses causes the lenses to retain good optical properties while closely conforming to the face of the wearer. The nosepiece further adapts the eyeglasses 10 to sports or protective use by performing a cushioning or shock-absorbing function, both by the use of resilient, relatively large nose pads separated from the lenses and by using a base portion which surrounds the bridge but is not rigidly secured thereto.

I claim:

1. Eyeglasses especially adapted for sports use, comprising:
   a pair of lenses and a bridge integrally formed with each other, said lenses having a relatively small height, a relatively large width and substantial wrap depth in the horizontal dimension, said lenses further having toric inner and outer surfaces which have radii of curvatures that are selected to provide zero power;
   a pair of temples pivotally secured to the outer edges of respective lenses; and
   a nosepiece secured to said bridge, said nosepiece having a pair of nose pads adapted to contact and conform to the nose of a wearer.

2. The eyeglasses of claim 1 wherein said nosepiece includes a base portion tightly surrounding said bridge while remaining free of rigid connection thereto so that said nosepiece is capable of absorbing shocks imparted to said lenses.

3. The eyeglasses of claim 2 wherein said base portion is mounted on said bridge by opening a slot formed in said base portion to allow said base portion to be placed around said bridge and then ultrasonically bonding adjoining edges of said slot to each other.

4. The eyeglasses of claim 2 wherein said nose pads project from said nosepiece along respective inner edges of said lenses and are spaced apart therefrom, said nose pads being resilient so that they are capable of absorbing shocks imparted to said lenses.

5. The eyeglasses of claim 4 wherein said nose pads have a length of more than 2 cm and a mean width of more than 0.7 cm so that the area of contact between said nose pads and the nose of a wearer is relatively large in order to spread shocks imparted to said lenses over a relatively large area.

6. The eyeglasses of claim 4 wherein said nose pads extend rearwardly of said lenses as they project from said base portion so that said nose pads are slightly recessed behind the front surfaces of said lenses.

7. The eyeglasses of claim 1, further including respective, relatively thick rims integrally formed along the upper edges of said lenses to strengthen said lenses.

8. The eyeglasses of claim 1, further including a pair of mounting pads integrally formed at the outer edges of respective lenses, and a hinge having one mounting leg embedded in each mounting pad and another portion secured to a respective temple.

9. Eyeglasses specially adapted for sports and protective use, comprising a pair of wraparound lenses having their inner edges interconnected by an integrally formed bridge normally spaced well above the nose of a wearer when in use, said lenses each having toric inner and outer surfaces curved to provide zero power; an inner edge diverging away from the inner edge of the other lens away from said bridge; an integrally formed, relatively thick reinforcing rim extending along the upper edge; a temple mounting pad integrally formed on the rear surface adjacent the outer edge; said eyeglasses further including a temple mounted on respective mounting pads through respective hinges; and a nosepiece secured to said bridge, said nosepiece having a resilient base portion that tightly surrounds said bridge but remains free of rigid connection hereto, said nosepiece having a pair of resilient nose pads integrally formed with said base portion and projecting rearwardly and downwardly therefrom along respective inner edges of said lenses, said nose pads having a substantial length and width and being spaced apart from said lenses to allow said nose pads to deflect, responsive to forces imparted to said lenses whereby said base portion and nose pads are capable of absorbing shocks induced by objects striking said lenses while said lenses protect the eyes of said wearer from all angles without interfering with the clarity of vision of said wearer.

* * * * *